April 9, 1957  L. B. CLAYTON  2,788,105
WALLBOARD CONVEYOR
Filed Nov. 29, 1955  2 Sheets-Sheet 1
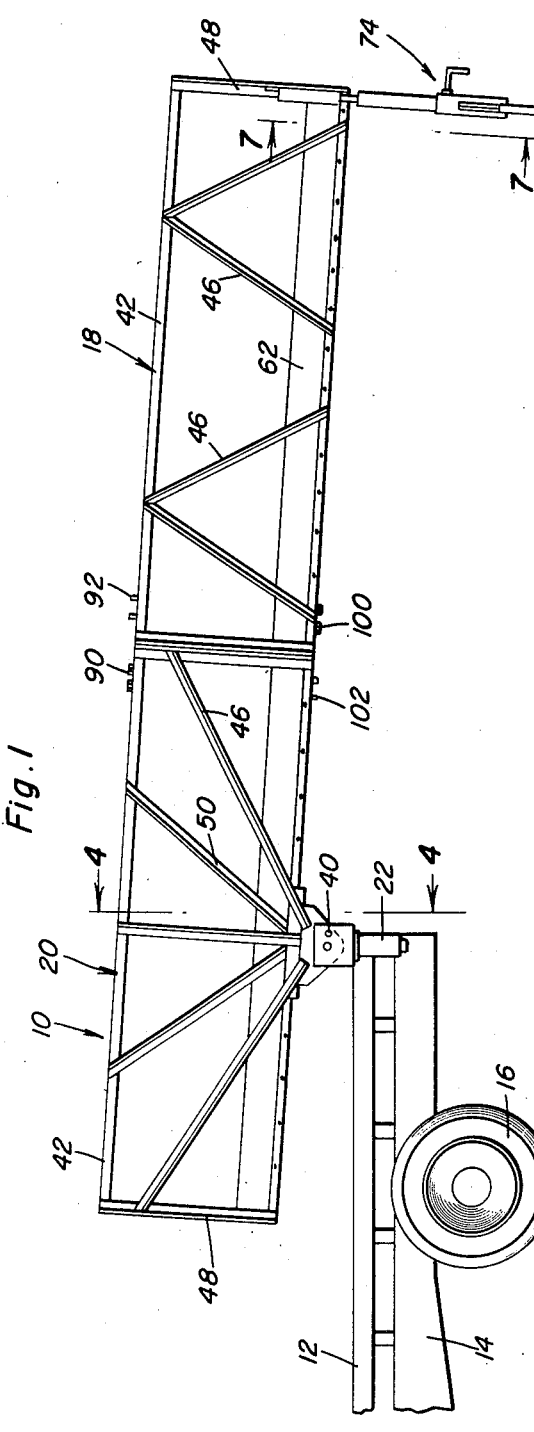
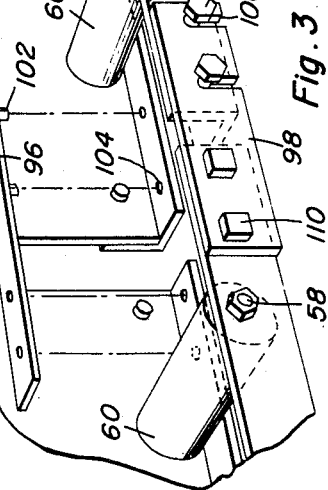
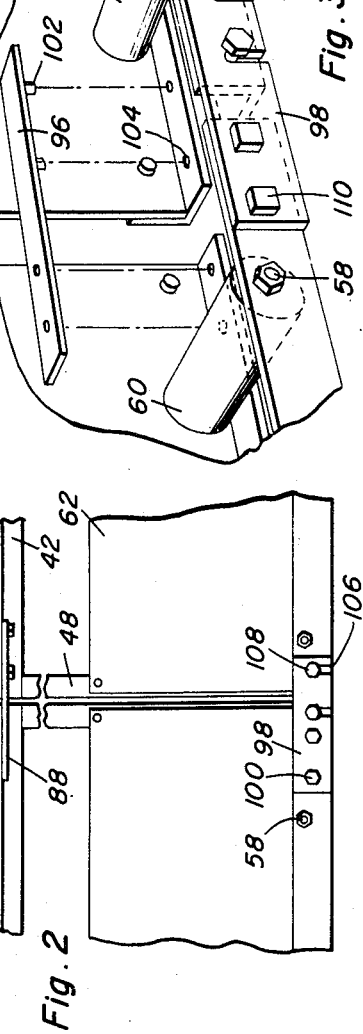
Leslie B. Clayton
INVENTOR.
BY April 9, 1957 — L. B. CLAYTON — 2,788,105
WALLBOARD CONVEYOR
Filed Nov. 29, 1955 — 2 Sheets-Sheet 2
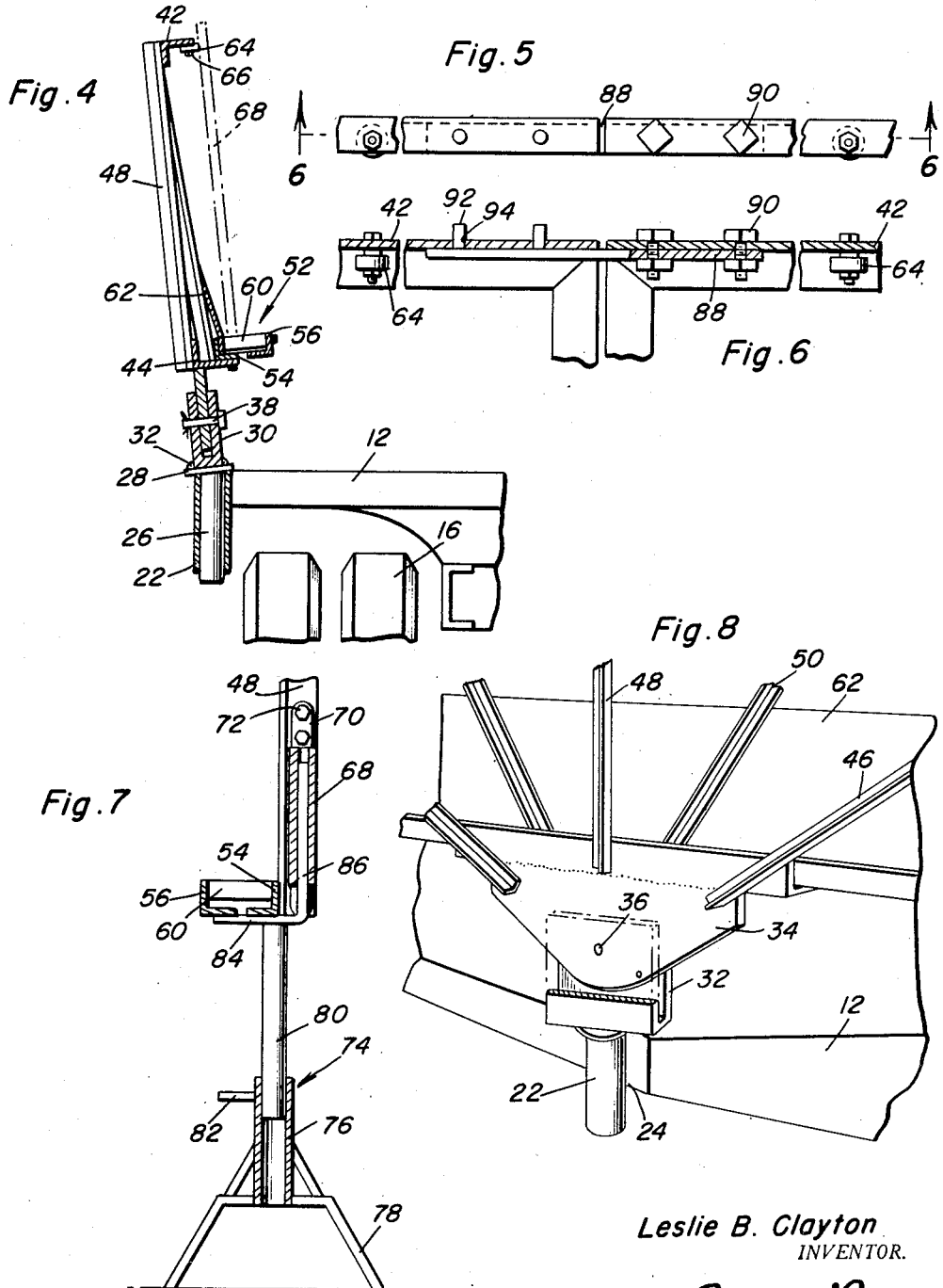
Leslie B. Clayton
INVENTOR.

United States Patent Office 2,788,105
Patented Apr. 9, 1957

2,788,105

WALLBOARD CONVEYOR

Leslie B. Clayton, Oklahoma City, Okla.

Application November 29, 1955, Serial No. 549,724

11 Claims. (Cl. 193—35)

This invention generally relates to a wallboard handling device and more specifically provides a conveyor arrangement forming a continuation-in-part of my co-pending application, Serial No. 454,185, filed September 3, 1954.

An object of the present invention is to provide a wallboard conveyor or handling device specifically constructed for attachment to a support adjacent a stack of wallboard together with means adjustably supporting the conveyor in vertically inclined position wherein the wallboard may move along the mechanism in substantially an upright position under the force of gravity wherein the wallboard will be in proper position for handling when it arrives at the lower end of the conveying mechanism.

Another object of the present invention is to provide a wallboard conveyor detachably mounted to a support which may be a vehicle or storage area wherein wallboard may be easily conveyed by the force of gravity from one area to another area thereby facilitating and increasing the efficiency of the wallboard handling operation.

Yet another object of the present invention is to provide a loading and unloading wallboard conveyor wherein the free end of the conveyor may be adjusted as to its vertical elevation to permit movement of wallboard in either direction on the conveyor by utilizing the force of gravity.

Still another important feature of the present invention is to provide a wallboard conveyor in accordance with the preceding objects which is simple in construction, easy to attach to a support, efficient and time-saving, well adapted for its intended purposes and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the conveyor mechanism of the present invention illustrating the same attached to a truck or similar load-carrying vehicle;

Figure 2 is an enlarged detailed view showing the rear of the joint between the adjacent sections constituting the conveyor;

Figure 3 is an exploded group perspective view illustrating the straps forming the lower bracket for detachably securing the longitudinal members forming the ledge in longitudinal alignment;

Figure 4 is a vertical sectional view taken substantially upon a plane passing along section line 4—4 of Figure 1 illustrating the manner of attachment of the conveyor to the truck body together with the position of the conveyor in relation to a vertical plane;

Figure 5 is a plan view of the connection between the upper members of the framework illustrating the upper bracket;

Figure 6 is a longitudinal, vertical sectional view taken substantially upon a plane passing along section line 6—6 of Figure 5 illustrating the specific structural details of the attaching bracket and the projecting lugs received in the openings for retaining the upper longitudinal members of the framework in longitudinal alignment;

Figure 7 is a vertical sectional view taken substantially upon a plane passing along section line 7—7 of Figure 1 illustrating the structural details of the supporting stand and its attachment to the free end of the conveyor; and, Figure 8 is an enlarged perspective view illustrating the construction of the supporting bracket for the conveyor.

Referring now specifically to the drawings, it will be seen that the numeral 10 generally designates the wallboard conveyor of the present invention for attachment to the rear side edge of a flat truck body 12 having the usual supporting frame 14, ground-engaging rails 16 and other structure normally employed in conventional load-carrying truck vehicles wherein the flat body 12 is employed for transporting a plurality of sheet members which are generally rigid in construction. An example of this type of sheet member is wallboard utilized in house construction which generally come in enlarged sheets and it is necessary that these sheets be handled rather cautiously inasmuch as they will break or damage will occur if they are flexed to any great amount. In view of the specific construction of wallboard, it is desirable that the wallboard normally be handled in substantially a vertical plane thereby causing a minimum of flexing or bending. While the wallboard conveyor is specifically illustrated in conjunction with a truck body 12, it will be understood that it may be employed in other orientations wherein wallboard is handled and is desired to be moved from one position to another wherein the wallboard conveyor may be set up from a storage area to a truck for loading the truck or vice versa. It will be noted that the wallboard conveyor 10 is constructed of a plurality of longitudinal sections detachably connected together wherein several sections may be employed depending upon the necessity in each instance and the length of travel of the wallboard.

The wallboard conveyor 10 includes a pair of longitudinally aligned and detachably connected sections 18 and 20 and while a pair of the sections have been indicated, it will be understood that any number of sections may be employed which are detachably connected together thereby forming a conveyor 10 which is as long as necessary.

The section 20 of the conveyor 10 is supported from the truck body 12 by a vertically disposed tubular sleeve or socket 22 secured to the side of the truck body 12 as by welding 24 or the like. The sleeve 22 is disposed in perpendicular relation for detachably and rotatably receiving a depending rod 26 having a plate 28 at the upper end wherein the plate 28 is disposed in inclined relation to the vertical axis of the rod 26 and abuts the upper edge of the tubular sleeve 22 which may also be inclined if desired. Secured to the plate 28 is an upwardly facing U-shaped bracket 30 secured to the plate 28 as by welding 32 or any other suitable means wherein the U-shaped bracket 30 is provided with spaced leg members 32 for receiving a depending plate 34 mounted on the section 20 of the conveyor 10.

The legs 32 and the plate 34 are provided with a centrally disposed aligned opening 36 for receiving a pivot pin 38 for hingedly securing the plate 34 to the bracket 30 for pivotal movement about an inclined horizontal axis formed by the pin 38. In spaced relation to the pin 38, an adjusting pin 40 is provided insertable through alignable openings in the bracket 30 and the plate 34 for adjusting the angular position of the plate 34 in relation to the bracket 30. With these two adjustments, it will be seen that the conveyor 10 may be adjusted about the inclined horizontal axis formed by the pin 38 and also the axis formed by the vertical post or rod 26 thereby giving substantially universal adjustment to the conveyor 10. The inclination of the plate 28 and the bracket 30 inclines the plate 34 and the entire conveyor 10 substantially 6° from a true vertical position for a purpose defined hereinafter.

The section 20 includes an upper angle iron longitudinal member 42 and a lower angle iron longitudinal member 44 secured together in rigid spaced parallel relation by a plurality of radially extending angle iron braces 46 as well as vertically extending angle iron braces 48. Two centrally disposed angle iron radial braces 50 extend downwardly and inwardly and are disposed against the inner surface of the angle iron member 44 for spacing a supporting ledge 52 and reinforcing the same. The supporting ledge 52 includes a pair of longitudinal angle iron members 54 and 56 interconnected by a plurality of longitudinally spaced spacer bolts 58 having horizontally disposed rollers 60 mounted thereon. An upstanding inclined plate 62 extends upwardly from the inner surface of the inner right angular member 54 and rests against the outer surface of the inclined braces 50. The upper longitudinal member 42 is provided with a plurality of longitudinally spaced rollers 64 mounted on generally vertical bolts 66 for engaging a piece of wallboard 68 adjacent the top edge thereof when the wallboard 68 is positioned on edge with the bottom edge engaging the horizontally disposed rollers 60.

The vertical inclination of the section 20 is such that when the wallboard 68 is disposed on the rollers 58 and against the rollers 64, the wallboard 68 will be self-sustaining and due to the inclined relation of the path of movement formed by the rollers 60, the wallboard 68 will move along the conveyor 10 by the force of gravity.

The section 18 of the conveyor 10 is substantially identical to the section 20 with the exception that the mounting bracket and the associated structure is omitted and a tubular socket 68 is attached thereto wherein the tubular socket 68 is provided with attaching brackets 70 supported by bolts 72 and the end right angular member 48 wherein the socket 68 is substantially vertically disposed.

A supporting stand generally designated by the numeral 74 is provided for supporting the free end of the section 18 and the supporting stand 74 includes a vertically disposed tubular socket 76 having a plurality of legs 78 depending therefrom in diverging relation for engaging a supporting surface wherein the socket 76 may be supported in substantially vertical position. It is noted that the legs 78 are disposed at diametrically opposed points on the socket 76 wherein the socket 76 may vary its vertical position in accordance with the angle of inclination of the conveyor 10 wherein the longitudinal axis of the socket 76 will be perpendicular to the longitudinal axis of the conveyor 10. A depending rod 80 is slidably telescopically adjustable in the socket 76 and clamp screw means 82 is provided for clamping the rod 80 in vertically adjustable position. An L-shaped member having a horizontal leg 84 and a vertical leg 86 is rigidly secured to the upper end of the depending rod 80 wherein the L-shaped rod member has a horizontal leg 84 thereof disposed under the ledge 52 in engagement with the undersurface of the angle iron members 54 and 56 and the vertical leg 86 of the L-shaped rod member is detachably and slidably received within the bore of the tubular socket 68 secured to the vertical angle iron member 48 of the section 18 of the conveyor 10 wherein the free end of the conveyor 10 is vertically adjustably supported by the stand 74 wherein the angle of inclination of the conveyor 10 may be easily adjusted and properly supported. It will be noted that as many sections as desired may be employed in order to convey the wallboard 68 to any desired destination and the stand 74 may be employed for either adjusting the free end of the conveyor 10 above or below the other end thereof for conveying wallboard in either direction by the force of gravity.

For connecting the adjacent ends of the sections 18 and 20 in detachable relation, upper and lower brackets are provided wherein the upper bracket includes an elongated strap 88 secured to the longitudinal member 42 of the section 20 by fastening bolts 90. The other end of the bracket 88 is provided with upstanding lugs 92 for engagement through apertures or openings 94 in the upper longitudinal member 42 of the section 18 thereby permitting the section 18 to be detachably engaged with the section 20 by vertical movement of the section 18 in relation to the section 20 of the conveyor 10. The lower bracket detachably connecting the lower portion of the sections 18 and 20 includes a pair of straps 96 and 98 with the strap 96 being secured to the upper surface of the inner angle iron member 54 on the section 18 by fastening bolts 100. The other end of the strap 96 is provided with depending pegs or lugs 102 for detachable reception in openings 104 in the inner angle iron member 54 in the section 20. The vertically disposed strap 98 is provided with a pair of inwardly extending notches 106 in the lower edge thereof for positioning over headed fasteners 108 on the angle iron member 56 on the section 20 and the strap 98 is secured to the angle iron member 56 on the section 18 by fastening bolts 110 thereby permitting detachable engagement of the adjacent ends of the sections 18 and 20 by relative vertical movement of the sections 18 and 20. It will be readily seen that additional sections similar in construction to the section 18 but without the socket 68 attached thereto may be provided between the sections 18 and 20 for forming a conveyor 10 of any desired length. The fact that each of the detachable connecting brackets is provided with a pair of longitudinally aligned lugs and notch means assures proper longitudinal alignment of the sections 18 and 20 when the sections are disposed in assembled relation.

The operation of the device will readily be apparent wherein the angle of inclination of movement of the wallboard or other sheet-like members may be varied and the entire conveyor is disposed in slightly inclined vertical relation to assure that the wallboard or the sheet-like members will be self-sustaining in substantially a vertical position wherein handling of the wallboard will be greatly facilitated with a minimum of damage to the wallboard by excessive flexing which normally occurs when the wallboard is transported in a horizontal position with support only at the ends thereof. The present conveyor permits the wallboard to be handled and conveyed in substantially a vertical position thereby eliminating such excessive flexing. While the device has been illustrated in conjunction with a truck, it will be understood that the conveyor may be employed for loading or unloading any type of vehicle from or to a storage area and may be employed for moving wallboard from one storage area to another or for any type of sheet material having similar characteristics.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A conveyor, sheet-like members comprising a plurality of longitudinally aligned elongated conveyor frameworks, means detachably interconnectiong the adjacent ends of said frameworks, means for adjustably supporting the free end of one of said frameworks in elevated position, means for adjustably supporting the free end of the framework remote from said one framework in a different elevated position from said free end of said one framework, each of said frameworks including a laterally projecting ledge adjacent the bottom edge, a plurality of horizontally disposed rollers on said ledge thereby forming an inclined path of movement for a sheet member positioned in an edgewise manner on said rollers, and a plurality of vertically disposed rollers mounted on said framework above the horizontal rollers for engaging the sheet member in spaced relation to the bottom edge for supporting the sheet member in substantially a vertical position for movement of the sheet member down the inclined path of movement by the force of gravity.

2. A wallboard conveyor comprising a bracket for attachment to a support, a framework adjustably secured to said bracket, a plurality of horizontally disposed rollers on said framework forming an inclined path of movement for a sheet of wallboard positioned on edge on the rollers, and a plurality of vertically disposed rollers spaced above the lower edge of said framework for engaging the sheet of wallboard in spaced relation to the bottom edge thereof wherein the sheet of wallboard will be moved along the rollers by the force of gravity, and an adjustable stand detachably connected to the end of the framework remote from the bracket, said stand being vertically adjustable for adjusting the angle of inclination of the framework.

3. A conveyor for sheets of substantially rigid material comprising a bracket to be mounted on a support, an elongated framework, means adjustably supporting said framework on said bracket, a projecting ledge on said framework adjacent the bottom thereof, roller means on said ledge for supporting a sheet of material positioned on edge to permit movement of the sheet of material along the ledge, roller means disposed on said framework in spaced relation to the ledge for engagement with the surface of the sheet of material in spaced relation to the lower edge thereof, said roller means on the framework being slightly spaced from a vertical plane passing through the roller means on said ledge thereby supporting the sheet of material in self-sustaining inclined position during movement thereof, and means for vertically adjustably supporting the free end of said framework thereby varying the angle of inclination of the ledge and the rollers thereon.

4. A conveyor for sheets of substantially rigid material comprising a bracket to be mounted on a support, an elongated framework, means adjustably supporting said framework on said bracket, a projecting ledge on said framework adjacent the bottom thereof, roller means on said ledge for supporting a sheet of material positioned on edge to permit movement of the sheet of material along the ledge, roller means disposed on said framework in spaced relation to the ledge for engagement with the surface of the sheet of material in space relation to the lower edge thereof, said roller means on the framework being slightly spaced from a vertical plane passing through the roller means on said ledge thereby supporting the sheet of material in self-sustaining inclined position during movement thereof, said roller means on the ledge including a plurality of rollers each being mounted for rotation about an inclined horizontal axis, said roller means on the framework including a plurality of rollers each being mounted for rotation about an inclined vertical axis, and means for vertically adjustably supporting the free end of said framework thereby varying the angle of inclination of the ledge and the rollers thereon.

5. A conveyor for sheets of substantially rigid material comprising a bracket to be mounted on a support, an elongated framework, means adjustably supporting said framework on said bracket, a projecting ledge on said framework adjacent the bottom thereof, roller means on said ledge for supporting a sheet of material positioned on edge to permit movement of the sheet of material along the ledge, roller means disposed on said framework in spaced relation to the ledge for engagement with the surface of the sheet of material in spaced relation to the lower edge thereof, said roller means on the framework being slightly spaced from a vertical plane passing through the roller means on said ledge thereby supporting the sheet of material in self-sustaining inclined position during movement thereof, said roller means on the ledge including a plurality of rollers each being mounted for rotation about an inclined horizontal axis, said roller means on the framework including a plurality of rollers each being mounted for rotation about an inclined vertical axis, and means for vertically adjustably supporting the free end of said framework thereby varying the angle of inclination of the ledge and the rollers thereon, said last named means including a stand having supporting legs and a vertically disposed tubular socket, a rod vertically adjustably mounted in said socket, an L-shaped rod member mounted on the upper end of said rod, said framework having a vertically disposed socket slidably receiving the vertical leg of the L-shaped rod member, the horizontal leg of the L-shaped rod member being disposed under the ledge for supporting the free end of the framework.

6. A conveyor for sheets of substantially rigid material comprising a bracket to be mounted on a support, an elongated framework, means adjustably supporting said framework on said bracket, a projecting ledge on said framework adjacent the bottom thereof, roller means on said ledge for supporting a sheet of material positioned on edge to permit movement of the sheet of material along the ledge, roller means disposed on said framework in spaced relation to the ledge for engagement with the surface of the sheet of material in spaced relation to the lower edge thereof, said roller means on the farmwork being slightly spaced from a vertical plane passing through the roller means on said ledge thereby supporting the sheet of material in self-sustaining inclined position during movement thereof, said roller means on the ledge including a plurality of rollers each being mounted for rotation about an inclined horizontal axis, said roller means on the framework including a plurality of rollers each being mounted for rotation about an inclined vertical axis, and means for vertically adjustably supporting the free end of said framework thereby varying the angle of inclination of the ledge and the rollers thereon, said framework including a plurality of longitudinally aligned sections, and means detachably connecting the adjacent ends of said sections, said detachably connecting means including an upper bracket projecting longitudinally from one of said sections, a lower longitudinally projecting bracket on the other of said sections, each of said brackets including projecting lugs disposed on remote sides of said brackets, said sections having openings forming sockets for said lugs for detachably connecting the sections.

7. A conveyor for sheets of substantially rigid material comprising a bracket to be mounted on a support, an elongated framework, means adjustably supporting said framework on said bracket, a projecting ledge on said framework adjacent the bottom thereof, roller means on said ledge for supporting a sheet of material positioned on edge to permit movement of the sheet of material along the ledge, roller means disposed on said framework in spaced relation to the ledge for engagement with the surface of the sheet of material in spaced relation to the lower edge thereof, said roller means on the framework being slightly spaced from a vertical plane passing through the roller means on said ledge thereby supporting the sheet of material in self-sustaining inclined position during movement thereof, said roller means on the ledge including a plurality of rollers each being mounted for rotation about an inclined horizontal axis, said roller means on the framework including a plurality of rollers each being mounted for rotation about an inclined vertical axis, and means for vertically adjustably supporting the free end of said framework thereby varying the angle of inclination of the ledge and the rollers thereon, said last named means including a stand having supporting legs and a vertically disposed tubular socket, a rod vertically adjustably mounted in said socket, an L-shaped rod member mounted on the upper end of said rod, said framework having a vertically disposed socket slidably receiving the vertical leg of the L-shaped rod member, the horizontal leg of the L-shaped rod member being disposed under the ledge for supporting the free end of the framework, said framework including a plurality of longitudinally aligned sections, and means detachably connecting the adjacent ends of said sections, said detachably connecting means including an upper bracket projecting longitudinally from one of said sections, a lower longitudinally projecting bracket on the other of said sections, each of said brackets including projecting lugs disposed on remote sides of said brackets, said sections having openings forming sockets for said lugs for detachably connecting the sections.

8. A conveyor for sheets of substantially rigid material comprising a bracket to be mounted on a support, an elongated framework, means adjustably supporting said framework on said bracket, a projecting ledge on said framework adjacent the bottom thereof, roller means on said ledge for supporting a sheet of material positioned on edge to permit movement of the sheet of material along the ledge, roller means disposed on said framework in spaced relation to the ledge for engagement with the surface of the sheet of material in spaced relation to the lower edge thereof, said roller means on the framework being slightly spaced from a vertical plane passing through the roller means on said ledge thereby supporting the sheet of material in self-sustaining inclined position during movement thereof, said roller means on the ledge including a plurality of rollers each being mounted for rotation about an inclined horizontal axis, said roller means on the framework including a plurality of rollers each being mounted for rotation about an inclined vertical axis, and means for vertically adjustably supporting the free end of said framework thereby varying the angle of inclination of the ledge and the rollers thereon, said framework including a plurality of longitudinally aligned sections, and means detachably connecting the adjacent ends of said sections, said detachably connecting means including an upper bracket projecting longitudinally from one of said sections, a lower longitudinally projecting bracket on the other of said sections, each of said brackets including projecting lugs disposed on remote sides of said brackets, said sections having openings forming sockets for said lugs for detachably connecting the sections, said ledge including a pair of spaced longitudinal members, said lower bracket including a pair of interconnecting straps attached to said longitudinal members for detachable engagement with the longitudinal members of another section.

9. A conveyor for sheets of substantially rigid material comprising a bracket to be mounted on a support, an elongated framework, means adjustably supporting said framework on said bracket, a projecting ledge on said framework adjacent the bottom thereof, roller means on said ledge for supporting a sheet of material positioned on edge to permit movement of the sheet of material along the ledge, roller means disposed on said framework in spaced relation to the ledge for engagement with the surface of the sheet of material in spaced relation to the lower edge thereof, said roller means on the framework being slightly spaced from a vertical plane passing through the roller means on said ledge thereby supporting the sheet of material in self-sustaining inclined position during movement thereof, said roller means on the ledge including a plurality of rollers each being mounted for rotation about an inclined horizontal axis, said roller means on the framework including a plurality of rollers each being mounted for rotation about an inclined vertical axis, and means for vertically adjustably supporting the free end of said framework thereby varying the angle of inclination of the ledge and the rollers thereon, said framework including a plurality of longitudinally aligned sections, and means detachably connecting the adjacent ends of said sections, said detachably connecting means including an upper bracket projecting longitudinally from one of said sections, a lower longitudinally projecting bracket on the other of said sections, each of said brackets including projecting lugs disposed on remote sides of said brackets, said sections having openings forming sockets for said lugs for detachably connecting the sections, said ledge including a pair of spaced longitudinal members, said lower bracket including a pair of interconnecting straps attached to said longitudinal members for detachable engagement with the longitudinal members of another section, one of said straps being generally horizontal with the other strap being generally disposed in a vertical plane, said one strap having depending lugs receivable in the openings, the other of said straps having downwardly opening notches for positioning over horizontally projecting lugs on the other section of said framework.

10. A conveyor for sheets of substantially rigid material comprising a bracket to be mounted on a support, an elongated framework, means adjustably supporting said framework on said bracket, a projecting ledge on said framework adjacent the bottom thereof, a roller means on said ledge for supporting a sheet of material positioned on edge to permit movement of the sheet of material along the ledge, roller means disposed on said framework in spaced relation to the ledge for engagement with the surface of the sheet of material in spaced relation to the lower edge thereof, said roller means on the framework being slightly spaced from a vertical plane passing through the roller means on said ledge thereby supporting the sheet of material in self-sustaining inclined position during movement thereof, said roller means on the ledge including a plurality of rollers each being mounted for rotation about an inclined horizontal axis, said roller means on the framework including a plurality of rollers each being mounted for rotation about an inclined vertical axis, and means for vertically adjustably supporting the free end of said framework thereby varying the angle of inclination of the ledge and the rollers thereon, said last named means including a stand having supporting legs and a vertically disposed tubular socket, a rod vertically adjustably mounted in said socket, an L-shaped rod member mounted on the upper end of said rod, said framework having a vertically disposed socket slidably receiving the vertical leg of the L-shaped rod member, the horizontal leg of the L-shaped rod member being disposed under the ledge for supporting the free end of the framework, said framework including a plurality of longitudinally aligned sections, and means detachably connecting the adjacent ends of said sections, said detachably connecting means including an upper bracket projecting longitudinally from one of said sections, a lower longitudinally projecting bracket on the other of said sections, each of said brackets including projecting lugs disposed on remote sides of said brackets, said sections having openings forming sockets for said lugs for detachably connecting the sections, said ledge including a pair of spaced longitudinal members, said lower bracket including a pair of interconnecting straps attached to said longitudinal members for detachable engagement with the longitudinal members of another section.

11. A conveyor for sheets of substantially rigid material comprising a bracket to be mounted on a support, an elongated framework, means adjustably supporting said framework on said bracket, a projecting ledge on said framework adjacent the bottom thereof, a roller means on said ledge for supporting a sheet of material positioned on edge to permit movement of the sheet of material along the ledge, roller means disposed on said framework in spaced relation to the ledge for engagement with the surface of the sheet of material in spaced relation to the lower edge thereof, said roller means on the framework being slightly spaced from a vertical plane passing through the roller means on said ledge thereby supporting the sheet of material in self-sustaining inclined position during movement thereof, said roller means on the ledge including a plurality of rollers each being mounted for rotation about an inclined horizontal axis, and means for vertically adjustably supporting the free end of said framework thereby varying the angle of inclination of the ledge and the rollers thereon, said last named means including a stand having supporting legs and a vertically disposed tubular socket, a rod vertically adjustably mounted in said socket, an L-shaped rod member mounted on the upper end of said rod, said framework having a vertically disposed socket slidably receiving the vertical leg of the L-shaped rod member, the horizontal leg of the L-shaped rod member being disposed under the ledge for supporting the free end of the framework, said framework including a plurality of longitudinally aligned sections, and means detachably connecting the adjacent ends of said sections, said detachably connecting means including an upper bracket projecting longitudinally from one of said sections, a lower longitudinally projecting bracket on the other of said sections, each of said brackets including projecting lugs disposed on remote sides of said brackets, said sections having openings forming sockets for said lugs for detachably connecting the sections, said ledge incluuding a pair of spaced longitudinal members, said lower bracket including a pair of interconnecting straps attached to said longitudinal members for detachable engagement with the longitudinal members of another section, one of said straps being generally horizontal with the other strap being generally disposed in a vertical plane, said one strap having depending lugs receivable in the openings, the other of said straps having downwardly opening notches for positioning over horizontally projecting lugs on the other section of said framework.

No references cited